US009014300B2

(12) United States Patent
Talwalkar et al.

(10) Patent No.: US 9,014,300 B2
(45) Date of Patent: Apr. 21, 2015

(54) SWITCHED-MODE HIGH-LINEARITY TRANSMITTER USING PULSE WIDTH MODULATION

(71) Applicant: QUALCOMM Incorporated, San Diego, CA (US)

(72) Inventors: Niranjan Anand Talwalkar, San Jose, CA (US); Sanjay Kasturia, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/025,602

(22) Filed: Sep. 12, 2013

(65) Prior Publication Data
US 2015/0071338 A1    Mar. 12, 2015

(51) Int. Cl.
*H04L 27/36* (2006.01)
*H04L 25/49* (2006.01)

(52) U.S. Cl.
CPC ............ *H04L 27/36* (2013.01); *H04L 25/4902* (2013.01)

(58) Field of Classification Search
CPC ............... H03K 7/08; H03F 2200/255; H03F 2200/387; H03F 2200/423; H03F 2200/543; H03F 2200/78; H03F 3/217; H03F 3/602; H03F 2200/331; G08B 13/2411; G08B 13/2471; G08B 13/2474; G08B 13/2477; H04L 27/36; H04L 25/4902
USPC ......... 375/286, 295, 296, 297, 298, 300, 302, 375/316, 320, 321, 324, 330, 338, 341, 345
See application file for complete search history.

(56) References Cited

U.S. PATENT DOCUMENTS

| | | | |
|---|---|---|---|
| 7,526,261 B2 | 4/2009 | Sorrells et al. | |
| 7,826,554 B2 | 11/2010 | Haque et al. | |
| 8,068,540 B2 | 11/2011 | De et al. | |
| 8,077,803 B2 * | 12/2011 | Hausmann et al. | 375/302 |
| 8,179,957 B2 | 5/2012 | Bryant | |
| 2003/0042976 A1 | 3/2003 | Midya et al. | |
| 2007/0103230 A1 | 5/2007 | Williams | |
| 2008/0284487 A1 * | 11/2008 | Pullela et al. | 327/355 |
| 2009/0146754 A1 * | 6/2009 | Bryant | 332/109 |
| 2009/0149151 A1 * | 6/2009 | Bryant | 455/341 |
| 2009/0245420 A1 * | 10/2009 | Hausmann et al. | 375/298 |
| 2009/0311980 A1 * | 12/2009 | Sjoland | 455/127.3 |
| 2010/0054325 A1 * | 3/2010 | Sjostrom | 375/238 |
| 2011/0129037 A1 * | 6/2011 | Staszewski et al. | 375/316 |
| 2011/0216818 A1 * | 9/2011 | Apostolidou et al. | 375/238 |
| 2012/0223774 A1 * | 9/2012 | Southcombe et al. | 330/124 R |
| 2013/0156089 A1 | 6/2013 | Hezar et al. | |

OTHER PUBLICATIONS

International Search Report and Written Opinion—PCT/US2014/055259—ISA/EPO—Dec. 5, 2014.

\* cited by examiner

*Primary Examiner* — Hirdepal Singh
(74) *Attorney, Agent, or Firm* — Mahamedi Paradice LLP

(57) ABSTRACT

A QAM transmitter is disclosed that may reduce the frequency of local clock signals and/or reduce the switching frequency of driver circuits when generating a QAM output signal for transmission. The QAM transmitter may generate a number of PWM signals indicative of in-phase (I) and quadrature (Q) signal components, and then use one or more selected even-order harmonics of the PWM signals to generate the QAM output signal. Odd-order harmonics of the PWM signals may be suppressed by selectively combining the PWM signals, and any remaining unwanted even-order harmonics may be suppressed using filters.

20 Claims, 9 Drawing Sheets

US 9,014,300 B2

SWITCHED-MODE HIGH-LINEARITY TRANSMITTER USING PULSE WIDTH MODULATION

TECHNICAL FIELD

The present embodiments relate generally to communication systems, and specifically to radio frequency transmitters using quadrature pulse-width modulation techniques.

BACKGROUND OF RELATED ART

Power consumption associated with the transmission of wireless signals (e.g., Wi-Fi, cellular, Bluetooth, etc.) may quickly drain the battery of a mobile device. Thus, it is desirable to reduce the power consumption of transmitters in mobile devices.

FIG. 1 is a block diagram of a conventional direct-conversion transmitter 100 using quadrature amplitude modulation (QAM). Transmitter 100 includes an antenna ANT, a baseband processor 110, and an analog front end (AFE) 120. The AFE 120 includes a digital-to-analog converter (DAC) 121A for the I signal path, a filter 122A for the I signal path, a local oscillator (LO) mixer 123A for the I signal path, a DAC 121B for the Q signal path, a filter 122B for the Q signal path, an LO mixer 123B for the Q signal path, a combiner 124, and a linear power amplifier (PA) 125. The mixers 123A and 123B up-convert the I and Q signals from baseband directly to the carrier frequency by mixing the I and Q signals with local oscillator signals LO(I) and LO(Q), respectively, where the frequency of the local oscillator signals is the carrier frequency. The combiner 124 combines the up-converted I and Q signals, and the PA 125 amplifies the combined I/Q signal for transmission as TX via the antenna ANT.

If the PA 125 is an op-amp (or another type of linear amplifier), then the PA 125 may be well suited for transmitting signals using various amplitude modulation techniques (e.g., OFDM) for which changes in the output signal should be proportional to changes in the input signal. However, linear amplifiers (e.g., the PA 125) consume a significant amount of power.

Although switched-mode output drivers consume less power than linear amplifiers such as PA 125, switched-mode output drivers are non-linear devices that may not be suitable for transmitting OFDM symbols. For example, because OFDM techniques are associated with higher peak-to-average ratios (PAR) than zero-PAR (GMSK) or low-PAR modulation techniques, switched-mode output drivers may not be able to achieve sufficient driver linearity for OFDM techniques. Further, because OFDM techniques typically use high frequency signals, driving switched-mode output drivers at such high rates may not be feasible because of limitations of switching speeds of switched-mode output drivers.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A transmitter and method of operation are disclosed that may reduce the frequency of local clock signals and/or reduce the switching frequency of associated driver circuits when generating a QAM output signal for transmission. The transmitter may generate a number of pulse-width modulation (PWM) signals indicative of in-phase (I) and quadrature (Q) signal components, and then use one or more selected even-order harmonics of the PWM signals to generate the QAM output signal. Odd-order harmonics of the PWM signals may be suppressed by selectively combining the PWM signals, and any remaining unwanted (e.g., un-selected) even-order harmonics may be suppressed using filters.

For at least some embodiments, the transmitter may include a baseband circuit to generate the I signal and the Q signal; a first circuit, having inputs to receive the I signal and a first clock signal, to generate a first PWM signal; a second circuit, having inputs to receive an inverted I signal and the first clock signal, to generate a second PWM signal; a third circuit, having inputs to receive the Q signal and a second clock signal, to generate a third PWM signal; a fourth circuit, having inputs to receive an inverted Q signal and the second clock signal, to generate a fourth PWM signal; a first signal combiner, coupled to the first and second circuits, to generate an output I signal in response to one or more even-ordered harmonics of the first and second PWM signals; a second signal combiner, coupled to the third and fourth circuits, to generate an output Q signal in response to one or more even-ordered harmonics of the third and fourth PWM signals; and a summing node to generate a QAM output signal in response to a summing of the output I signal and the output Q signal. For some embodiments, a frequency of the QAM output signal approximately equals a number N times a frequency of the first and second clock signals, wherein N is an even integer greater than or equal to 2.

For some embodiments, the first signal combiner may suppress odd order harmonics (including fundamental frequency components) of the first and second PWM signals prior to generating the output I signal; and the second signal combiner may suppress odd order harmonics (including fundamental frequency components) of the third and fourth PWM signals prior to generating the output Q signal. Unwanted even-order harmonics may be suppressed from the output I and Q signals using suitable filters.

The present embodiments may include switched-mode amplifiers (e.g., formed using CMOS inverter circuits) to amplify the PWM signals prior to summing the output I and Q signals. For at least some embodiments, the switched-mode amplifiers may be switched at a switching frequency that is $1/N$ times the frequency of the QAM output signal. In this manner, using the $N^{th}$-order harmonics of the PWM signals to generate the QAM output signal may allow the frequency of the first and second clock signals to be $1/N^{th}$ the frequency of the QAM output signal, and may allow the switched-mode amplifiers to be switched at $1/N^{th}$ of the frequency of the QAM output signal. This, in turn, may allow for cleaner (e.g., more stable) clock signals (e.g., compared to transmitters in which the first and second clock signals have the same frequency as the QAM output signal) and for more efficient operation of the switched-mode amplifiers (e.g., compared to transmitters in which the switching frequency of the switched-mode amplifiers is the same frequency as the QAM output signal).

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

The present embodiments are discussed below in the context of processing signals having exemplary frequency values for simplicity only. It is to be understood that the present embodiments are equally applicable for processing signals of various suitable frequencies and/or frequency ranges, and for processing signals using any suitable encoding and/or modulation technique.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

As used herein, a harmonic is a component frequency of a signal that is an integer multiple of the signal's fundamental frequency (e.g., if the fundamental frequency of a signal is denoted as f, then the harmonics have frequencies equal to 2f, 3f, 4f, 5f, and so on). Thus, as used herein, the first-order harmonic refers to signal components at the fundamental frequency, the second-order harmonic refers to signal components at twice the fundamental frequency, the third-order harmonic refers to signal components at three times the fundamental frequency, and so on.

Figure 2A:
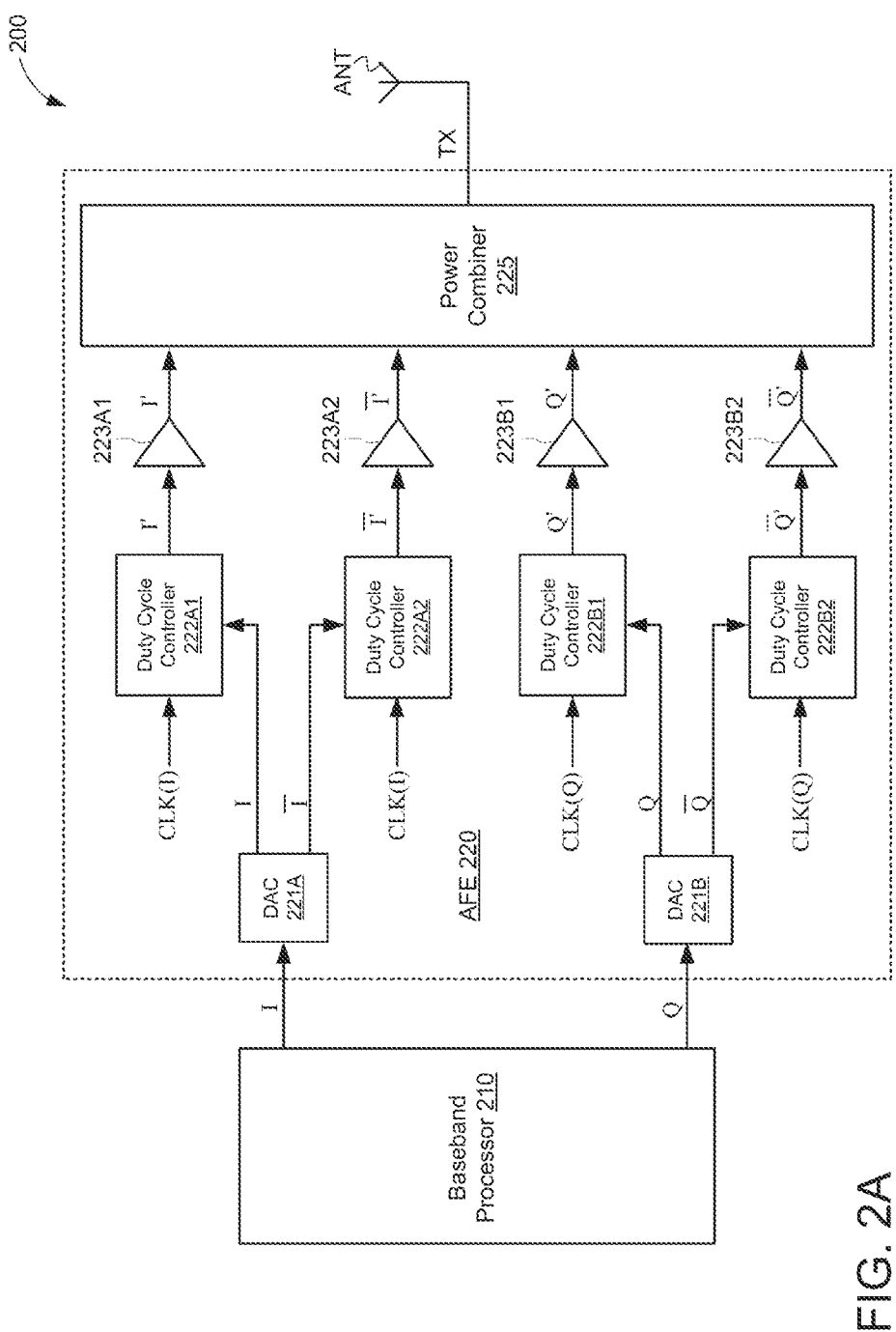
FIG. 2A is a block diagram of a QAM transmitter in accordance with some embodiments.

FIG. 2A is a block diagram of a transmitter 200 that may use quadrature amplitude modulation (QAM) in accordance with the present embodiments. The transmitter 200 may be included within a communication device (e.g., communication device 500, FIG. 5). The transmitter 200 is shown in FIG. 2A as including a baseband processor 210, an analog front-end (AFE) 220, and an antenna ANT. The baseband processor 210, which is coupled to the AFE 220, may generate in-phase (I) and quadrature (Q) signals to be transmitted from transmitter 200 via the antenna ANT. For some embodiments, the I and Q signals may represent different data to be transmitted from transmitter 200 using QAM techniques.

The AFE 220 includes two DACs 221A-221B, four duty cycle controllers 222A1-222A2 and 222B1-222B2, four driver circuits 223A1-223A2 and 223B1-223B2, and a power combiner 225. The DAC 221A, duty cycle controllers 222A1-222A2, and driver circuits 223A1-223A2 (which may collectively be referred to as the I signal processing path) are to process the I signal. The DAC 221B, duty cycle controllers 222B1-222B2, and driver circuits 223B1-223B2 (which may collectively be referred to as the Q signal processing path) are to process the Q signal. The power combiner 225 is to combine the I and Q signal components to generate a QAM output signal TX to be transmitted from antenna ANT. Although only one antenna ANT is shown in FIG. 2A, it is to be understood that transmitter 200 may include any suitable number of antennas. Similarly, although only one baseband processor 210 and AFE 220 are shown in FIG. 2A, it is to be understood that transmitter 200 may include any suitable number of baseband processors and/or and AFEs.

Note that the components described herein with reference to FIG. 2A are exemplary only. In various embodiments, one or more of the components described may be omitted, combined, or modified, and additional components may be included. For example, the I path and the Q path may include other various elements such as local oscillators (e.g., to generate local clock signals, discussed below), additional amplifiers, filters, and/or other suitable components.

For the I path, the first DAC 221A converts the digital baseband I signal (as received from the baseband processor 210) into an analog I signal. The first DAC 221A also includes an inverted output terminal to generate an inverted analog I signal ($\bar{I}$) (e.g., where the I signal and the $\bar{I}$ signal are complementary analog signals). The analog I signal is provided as an input data signal to first duty cycle controller 222A1, and the analog $\bar{I}$ signal is provided as an input data signal to second duty cycle controller 222A2. The duty cycle controllers 222A1 and 222A2 each include an input terminal to receive a first clock signal CLK(I). The first duty cycle controller 222A1 compares the I signal with the first clock signal CLK(I) to generate a first PWM signal I', and the second duty cycle controller 222A2 compares the $\bar{I}$ signal with the first clock signal CLK(I) to generate a second PWM signal $\bar{I}'$. The first PWM signal I' may have a pulse width that is proportional to the amplitude of the original analog signal I, and the second PWM signal $\bar{I}'$ may have a pulse width that is proportional to the amplitude of the original inverted analog signal $\bar{I}$. By converting amplitude variations associated with the I signal into pulse-width variations associated with the first PWM signal I', the first duty cycle controller 222A1 may translate I signal data from the voltage domain into the time domain. Similarly, by converting amplitude variations associated with the $\bar{I}$ signal into pulse-width variations associated with the second PWM signal $\bar{I}'$, the second duty cycle controller 222A2 may translate $\bar{I}$ signal data from the voltage domain into the time domain.

For the Q path, the second DAC 221B converts the digital baseband Q signal (as received from the baseband processor 210) into an analog Q signal. The second DAC 221B also includes an inverted output terminal to generate an inverted analog Q signal ($\bar{Q}$) (e.g., where the Q signal and the $\bar{Q}$ signal are complementary analog signals). The analog Q signal is provided as an input data signal to third duty cycle controller 222B1, and the analog $\overline{Q}$ signal is provided as an input data signal to fourth duty cycle controller 222B2. The duty cycle controllers 222B1 and 222B2 each include an input terminal to receive a second clock signal CLK(Q). The third duty cycle controller 222B1 compares the Q signal with the second clock signal CLK(Q) to generate a third PWM signal Q', and the fourth duty cycle controller 222B2 compares the $\overline{Q}$ signal with the second clock signal CLK(Q) to generate a fourth PWM signal $\overline{Q}'$. The third PWM signal Q' may have a pulse width that is proportional to the amplitude of the original analog signal Q, and the fourth PWM signal $\overline{Q}'$ may have a pulse width that is proportional to the amplitude of the original inverted analog signal $\overline{Q}$. By converting amplitude variations associated with the Q signal into pulse-width variations associated with the third PWM signal Q', the third duty cycle controller 222B1 may translate Q signal data from the voltage domain into the time domain. Similarly, by converting amplitude variations associated with the $\overline{Q}$ signal into pulse-width variations associated with the fourth PWM signal $\overline{Q}'$, the fourth duty cycle controller 222B2 may translate $\overline{Q}$ signal data from the voltage domain into the time domain.

Thus, for at least some embodiments, each of the duty cycle controllers 222A1-222A2 and 222B1-222B2 may include or be associated with a comparator circuit that compares the input data signal (e.g., one of I, $\overline{I}$, Q, and $\overline{Q}$) with the corresponding clock signal (e.g., one of CLK(I) and CLK(Q)) to generate the corresponding PWM signal. For other embodiments, the duty cycle controllers 222A1-222A2 and 222B1-222B2 of FIG. 2A may be any suitable type of modulator including, for example, a delta modulator, a sigma delta modulator, a pulse width modulator, a pulse position modulator, and/or a pulse duration modulator.

For some embodiments, the first clock signal CLK(I) and the second clock signal CLK(Q) have the same frequency as the QAM output signal. When the duty cycle controllers 222A1 and 222A2 compare respective data signals I and $\overline{I}$ with the first clock signal CLK(I), the duty cycle controllers 222A1 and 222A2 may up-convert the baseband signals I and $\overline{I}$ into a plurality of frequency components that are centered around integer multiples of the frequency of the first clock signal CLK(I). Similarly, when the duty cycle controllers 222B1 and 222B2 compare respective data signals Q and $\overline{Q}$ with the second clock signal CLK(Q), the duty cycle controllers 222B1 and 222B2 may up-convert the baseband signals Q and $\overline{Q}$ into a plurality of frequency components that are centered around integer multiples of the frequency of the second clock signal CLK(Q).

Figure 3A:
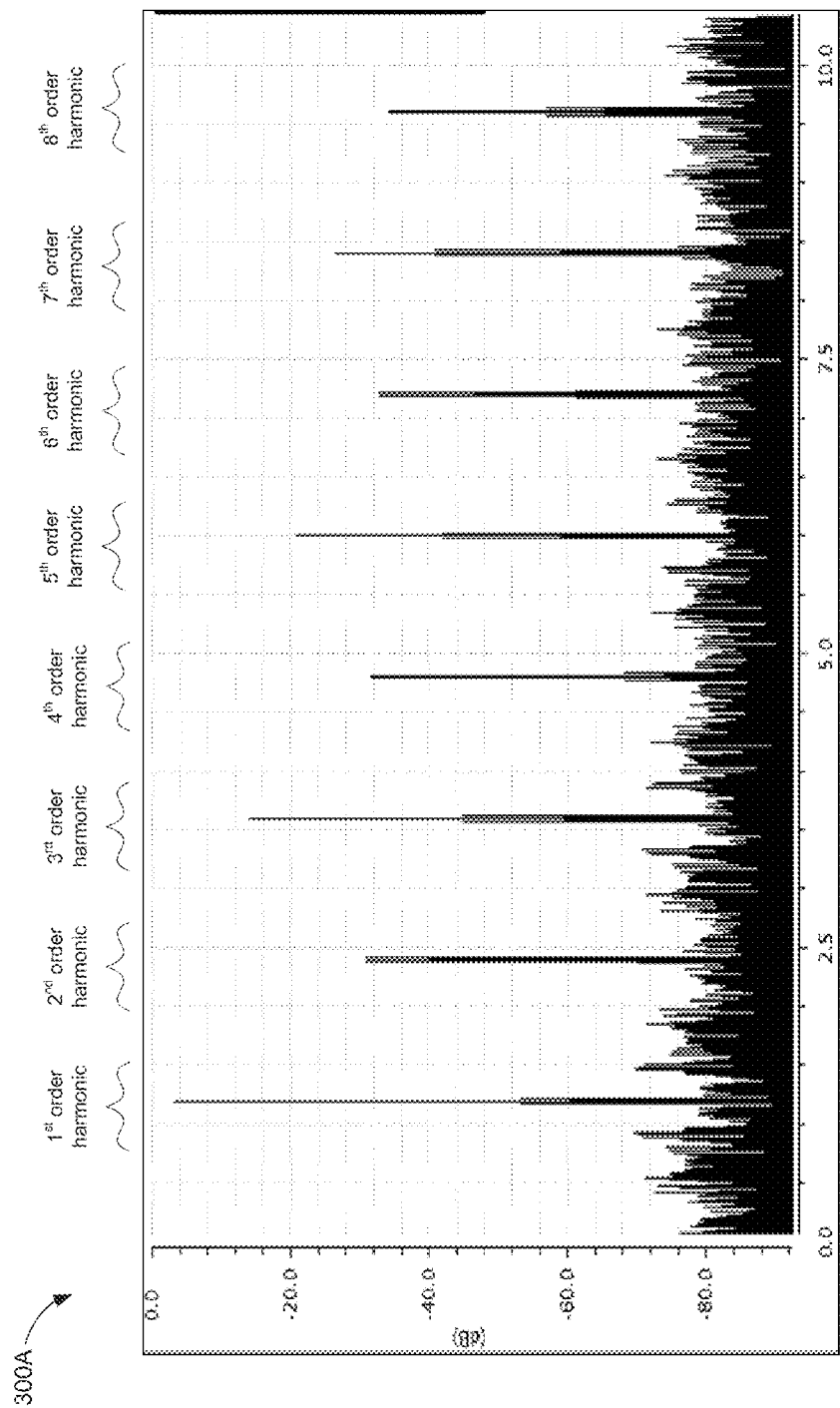
FIG. 3A depicts the creation of first through eighth order harmonics associated with generating a PWM signal in response to an input data signal and a clock signal.

For example, FIG. 3A shows a graph 300A that illustrates the generation (e.g., by an exemplary one of duty cycle controllers 222) of a plurality of harmonics in response to comparing an input data signal (e.g., one of I, $\overline{I}$, Q, or $\overline{Q}$) having a frequency $f_{sig}$=11 MHz with a local clock signal (e.g., one of CLK(I) or CLK(Q)) having a frequency $f_{CLK}$=1.2 GHz. As shown in FIG. 3A, the first-order harmonic occurs at the fundamental frequency $f_{CLK}$=1.2 GHz, the second-order harmonic occurs at $f_2=2*f_{CLK}\approx$2.4 GHz, the third-order harmonic occurs at $f_3=3*f_{CLK}\approx$3.6 GHz, the fourth-order harmonic occurs at $f_4=4*f_{CLK}\approx$4.8 GHz, the fifth-order harmonic occurs at $f_5=5*f_{CLK}\approx$6.0 GHz, the sixth-order harmonic occurs at $f_6=6*f_{CLK}\approx$7.2 GHz, the seventh-order harmonic occurs at $f_7=7*f_{CLK}\approx$8.4 GHz, and the eighth-order harmonic occurs at $f_8=8*f_{CLK}\approx$9.6 GHz. Thus, each of the PWM signals I', $\overline{I}'$, Q', and $\overline{Q}'$ may contain a plurality of harmonic components centered around frequencies that are integer multiples of the fundamental frequency, $f_{CLK}$.

Referring again to FIG. 2A, the PWM signals I', $\overline{I}'$, Q', and $\overline{Q}'$ are amplified by respective driver circuits 223A1, 223A2, 223B1, and 223B2, and the resulting amplified PWM signals I', $\overline{I}'$, Q', and $\overline{Q}'$ are provided to the power combiner 225. For at least some embodiments, the driver circuits 223A1, 223A2, 223B1, and 223B2 may be switched-mode driver circuits, which typically consume less power than linear amplifiers such as op-amps. As described in more detail below, driver circuits 223A1, 223A2, 223B1, and 223B2 may be switched at a frequency equal to fclk/N, where N (which is an even integer greater than or equal to 2) indicates which harmonics of the PWM signals I', $\overline{I}'$, Q', and $\overline{Q}'$ are to be used to generate the QAM output signal 225. Thus, by using higher-order harmonics of the PWM signals I', $\overline{I}'$, Q', and $\overline{Q}'$ to generate the QAM output signal (e.g., rather than the first-order harmonics), the switching frequency of the driver circuits 223A1, 223A2, 223B1, and 223B2 may be significantly reduced, which in turn allows the driver circuits 223A1, 223A2, 223B1, and 223B2 to be used for amplifying higher-frequency signals. For some embodiments, the driver circuits 223A1, 223A2, 223B1, and 223B2 may be formed using CMOS inverter circuits, which consume very little (if any) DC power.

The power combiner 225 includes input terminals coupled to output terminals of corresponding driver circuits 223A1, 223A2, 223B1, and 223B2, and includes an output terminal to generate the QAM output signal. In operation, the power combiner 225 combines the PWM signals I', $\overline{I}'$, Q', and $\overline{Q}'$ to generate the QAM output signal TX for transmission via antenna ANT. More specifically, the power combiner 225 may subtract the second PWM signal $\overline{I}'$ from the first PWM signal I' in a manner that suppresses odd-order harmonics from the I signal, and may subtract the fourth PWM signal $\overline{Q}'$ from the third PWM signal Q' in a manner that suppresses odd-order harmonics from the Q signal. As a result, the resulting output I signal may primarily contain even-order harmonics of the original analog I signal, and the resulting output Q signal may primarily contain even-order harmonics of the original analog Q signal. The power combiner 225 may remove a number of unwanted even-ordered harmonics from the output I and Q signals (e.g., using filters), and may then sum the resulting output I and Q signals to generate the QAM output signal.

Figure 2B:
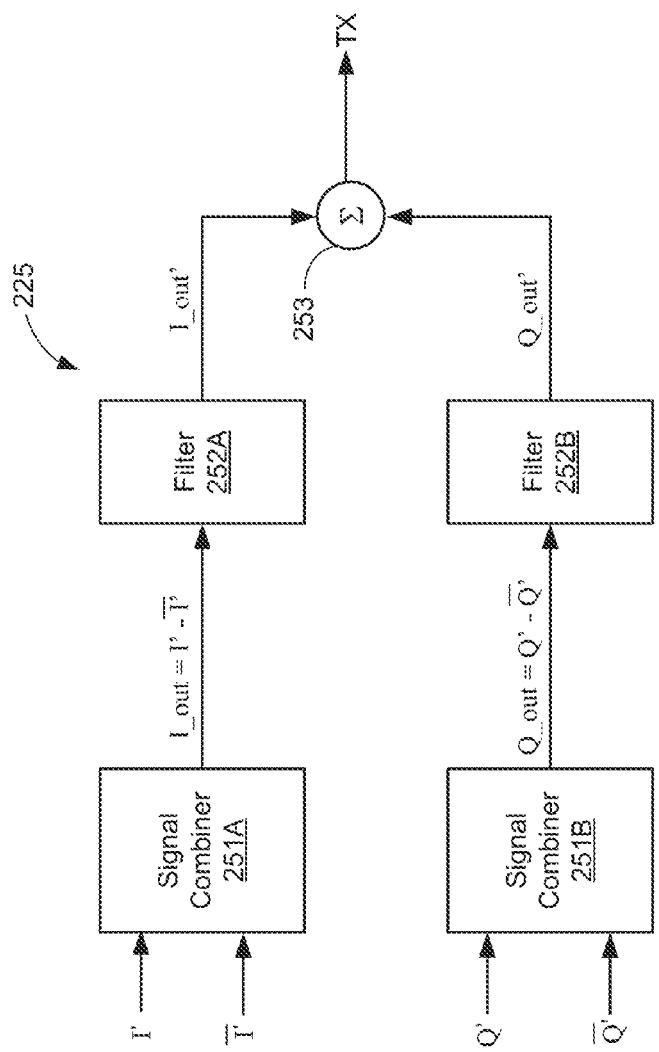
FIG. 2B is a block diagram of one embodiment of the power combiner of FIG. 2A.

More specifically, FIG. 2B shows an exemplary embodiment of the power combiner 225 as including a first signal combiner 251A, a second signal combiner 251B, a first filter 252A, a second filter 252B, and a summing node 253. For at least some embodiments, the first signal combiner 251A subtracts the second PWM signal $\overline{I}'$ from the first PWM signal I' to generate the output I signal, and the second signal combiner 251B subtracts the fourth PWM signal $\overline{Q}'$ from the third PWM signal Q' to generate the output Q signal. Subtracting the second PWM signal $\overline{I}'$ from the first PWM signal I' using first signal combiner 251A may remove (or at least suppress) odd order harmonics from the I signal, and subtracting the fourth PWM signal $\overline{Q}'$ from the third PWM signal Q' using second signal combiner 251B may remove (or at least suppress) odd order harmonics from the Q signal. Although the odd-order harmonics may be suppressed using filters, suppressing the odd-order harmonics via subtraction using signal combiners 251A-251B may advantageously relax the requirements (and thus the size, cost, and/or complexity) of such filters.

Figure 3B:
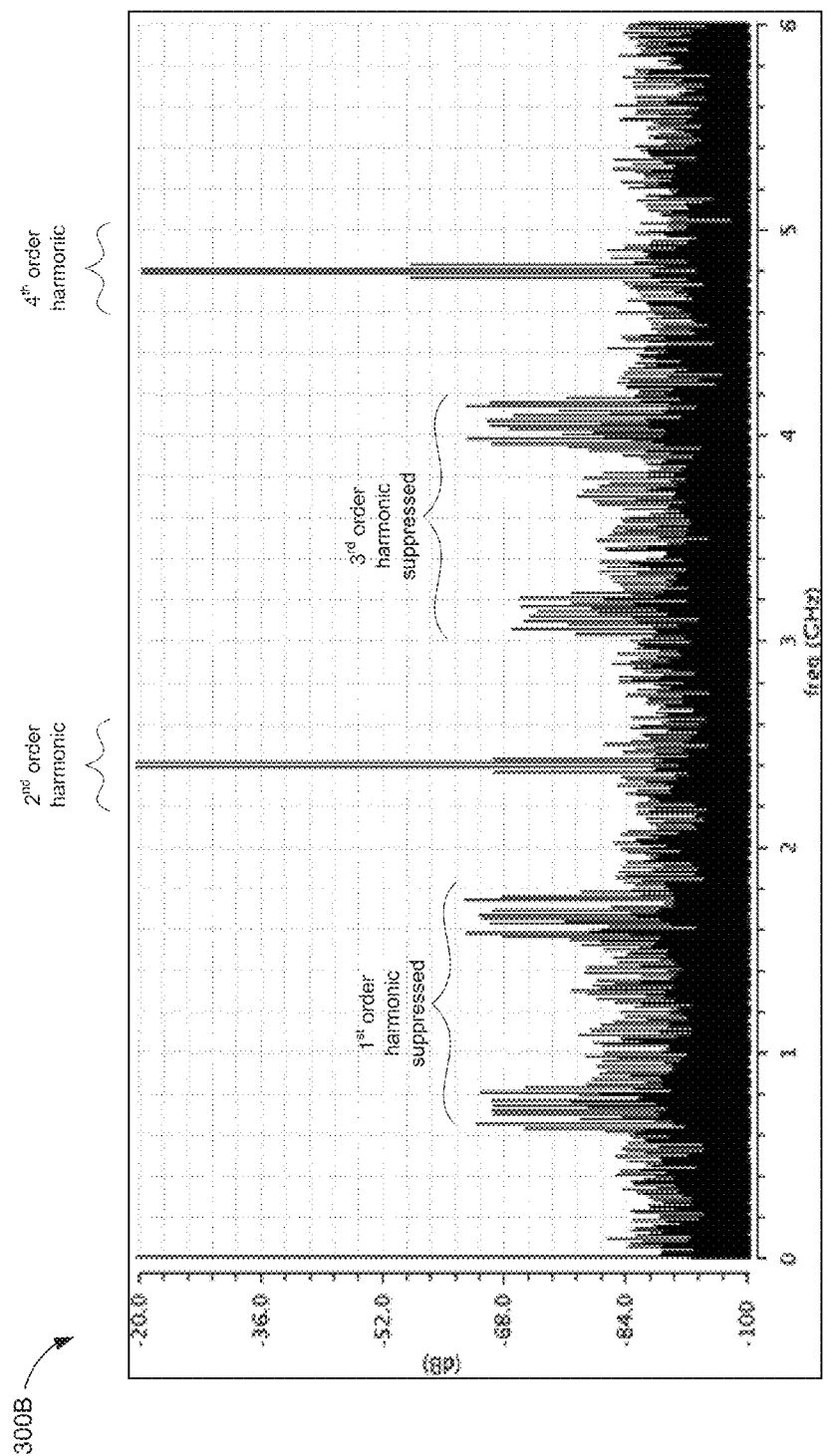
FIG. 3B depicts the elimination of odd order harmonics from a PWM signal in accordance with some embodiments.

For example, FIG. 3B shows a graph 300B that illustrates the suppression (e.g., by an exemplary one of signal combiners 251) of odd-order harmonics from input data signals (e.g., from the I and Q signals) such that the resulting data signals primarily contain only even-order harmonics. As shown in FIG. 3B, the amplitudes of the first-order harmonic (at the fundamental frequency $f_{CLK}$=1.2 GHz) and the third-order harmonic (at $f_3$=3*$f_{CLK}$≈3.6 GHz) are suppressed by several orders of magnitude, while the second-order harmonic (at $f_2$=2*$f_{CLK}$≈2.4 GHz) and the fourth-order harmonic (at $f_4$=4*$f_{CLK}$≈4.8 GHz) are preserved. Note that although not shown in FIG. 3B for simplicity, other odd-order harmonics (e.g., the fifth-order harmonic at $f_5$=5*$f_{CLK}$≈6.0 GHz, the seventh-order harmonic at $f_7$=7*$f_{CLK}$≈8.4 GHz, and so on) are also suppressed by the signal combiners 251, while other even-order harmonics (e.g., the sixth-order harmonic at $f_6$=6*$f_{CLK}$≈7.2 GHz, the eighth-order harmonic at $f_8$=8*$f_{CLK}$≈9.6 GHz, and so on) are preserved.

Referring again to FIG. 2B, the output I signal is provided to the first filter 252A, and the output Q signal is provided to the second filter 252B. Filter 252A may be configured to filter a number of the remaining even-order harmonics from the output I signal, and filter 252B may be configured to filter a number of the remaining even-order harmonics from the output Q signal. For one example, filters 252A-252B may be configured to filter all harmonics having an order value greater than N=2 so that the resulting output I and Q signals primarily contain only $2^{nd}$ order harmonics. For another example, filters 252A-252B may be configured to filter all harmonics having an order value greater than to N=4 so that the resulting output I and Q signals primarily contain only $2^{nd}$ order harmonics and $4^{th}$ order harmonics. For yet another example, filters 252A-252B may be configured to filter all harmonics having an order value greater than N=4 and less than N=4 so that the resulting output I and Q signals primarily contain only $4^{th}$ order harmonics. More generally, filters 252A-252B may be configured to filter all harmonics, except for a selected group of even-order harmonics, from the output I and Q signals prior to generation of the QAM output signal.

For some embodiments, filters 252A-252B may be suitable low-pass filters (e.g., such that only those even-ordered harmonics below the value of N remain in the output I and Q signals). For other embodiments, filters 252A-252B may be suitable band-pass filters (e.g., such that only those even-ordered harmonics within a desired range remain in the output I and Q signals).

The output signals I_out' and Q_out' provided by the filters 252A and 252B, respectively, are summed together in the summing node 253 to generate the QAM output signal TX. As described above, the resulting QAM output signal TX may contain only a selected group of harmonics of the original I and Q signal components generated by the duty cycle controllers 222A1-222A2 and 222B1-222B2, which in turn may allow the driver circuits 223A1-223A2 and 223B1-223B2 to be switched at a switching frequency that is 1/Nth of the frequency of the QAM output signal, where N is an even integer indicative of which even-ordered harmonics of the I and Q signal components are to be used (e.g., not suppressed by power combiner 225) to generate the QAM output signal.

For one example, transmitter 200 may be configured to use the second-order (e.g., N=2) harmonics of the up-converted I and Q signal components to generate the QAM output signal TX. For purposes of discussion with respect to this example, the analog data signals I and Q have a frequency of $f_{sig}$=11 MHz, and the clock signals CLK(I) and CLK(Q) have a frequency of $f_{CLK}$=1.2 GHz, as depicted on graph 300C shown in FIG. 3C. The PWM signals I', $\overline{I'}$, Q', and $\overline{Q'}$ generated by corresponding duty cycle controllers 222A1-222A2 and 222B1-222B2 may each include a plurality of harmonics, as described above with respect to FIG. 3A. More specifically, each of the PWM signals I', $\overline{I'}$, Q', and $\overline{Q'}$ may contain first-order harmonic signal components at frequencies equal to $f_{CLK}$+2*$f_{sig}$ and equal to $f_{CLK}$−2*$f_{sig}$, and may contain second-order harmonic signal components at frequencies equal to 2$f_{CLK}$+$f_{sig}$ and equal to 2*$f_{CLK}$−$f_{sig}$ (harmonics having an order greater than N=2 are not shown in FIG. 3C for simplicity). For this example, it is desirable to use the second-order harmonics of the PWM signals I', $\overline{I'}$, Q', and $\overline{Q'}$ to generate the QAM output signal, and therefore all harmonics other than the second-order harmonics are to be suppressed from the I and Q signal information.

First, the odd-order harmonics (including signal components near the fundamental frequency at $f_{CLK}$) may be suppressed. For at least some embodiments, the odd-order harmonics may be suppressed from the I signal by subtracting the second PWM signal $\overline{I'}$ from the first PWM signal I' using first signal combiner 251A, and the odd-order harmonics may be suppressed from the Q signal by subtracting the fourth PWM signal $\overline{Q'}$ from the third PWM signal Q' using second signal combiner 251B (e.g., as described above and depicted in FIG. 3B). For other embodiments, the odd-order harmonics may be suppressed by a number of suitable filters. Then, all remaining even-order harmonics, except for the desired second-order harmonics, may be suppressed. For at least some embodiments, all even-order harmonics except for the second-order harmonics may be suppressed from the I signal via first filter 252A, and all even-order harmonics except for the second-order harmonics may be suppressed from the Q signal via second filter 252B.

Because the second-order harmonics have a frequency that is twice the frequency of $f_{CLK}$, the frequency of the resulting QAM output signal may be twice the frequency of the clock signals CLK(I) and CLK(Q). In other words, by using the second-order harmonics of the I and Q PWM signals to generate the QAM output signal, the frequency of the clock signals CLK(I) and CLK(Q) may be only one-half of the frequency of the QAM output signal, which in turn may relax the requirements of the clock generation circuits (e.g., local oscillator circuits) used to generate CLK(I) and CLK(Q) (e.g., because it is typically easier to generate lower-frequency clock signals than to generate higher-frequency clock signals). Note that when using the second-order harmonics of the I and Q PWM signals to generate the QAM output signal, the phase-difference between the clock signals CLK(I) and CLK(Q) may be 45 degrees (e.g., as opposed to the 90 degree phase-shift normally associated with QAM techniques).

In addition, because the switching frequency of the driver circuits 223A1-223A2 and 223B1-223B2 is approximately equal to $f_{CLK}$, driver circuits 223A1-223A2 and 223B1-223B2 may be switched at one-half the frequency of the QAM output signal, which in turn may improve the efficiency of the driver circuits 223A1-223A2 and 223B1-223B2 (e.g., as compared with operations in which the switching frequency of the driver circuits 223A1-223A2 and 223B1-223B2 is equal to 2*$f_{CLK}$).

Figure 3C:
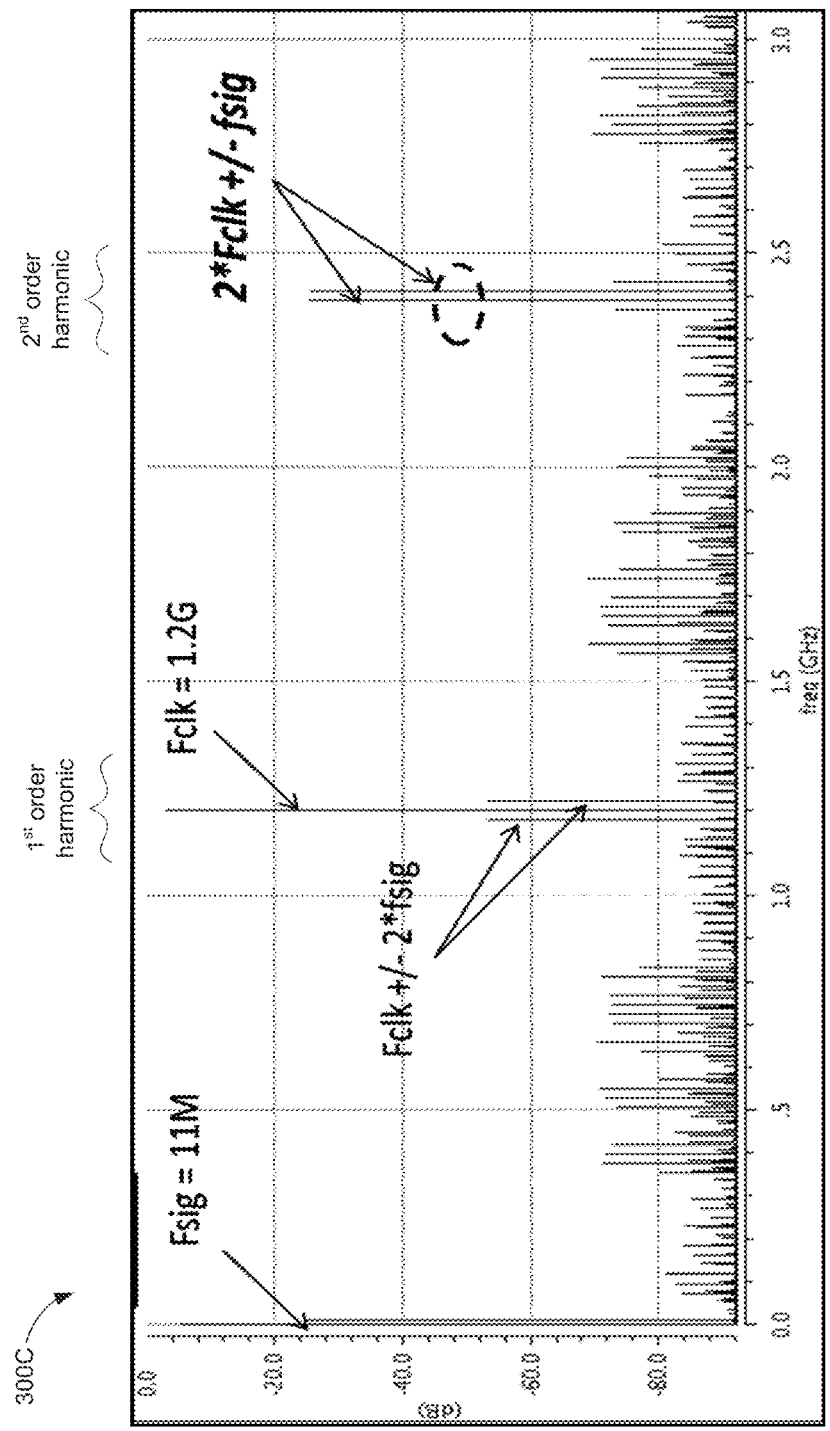
FIG. 3C depicts the creation of first and second order harmonics associated with generating a PWM signal in response to an input data signal and a clock signal, in accordance with some embodiments.

For another example, transmitter 200 may be configured to use the fourth-order (e.g., N=4) harmonics of the up-converted I and Q signal components to generate the QAM output signal. For purposes of discussion with respect to this example, the analog data signals I and Q have a frequency of $f_{sig}$=11 MHz, and the clock signals CLK(I) and CLK(Q) have a frequency of $f_{CLK}$=1.2 GHz, as depicted in FIG. 3C. The PWM signals I', $\overline{I'}$, Q', and $\overline{Q'}$ generated by corresponding duty cycle controllers 222A1-222A2 and 222B1-222B2 may each include a plurality of harmonics, as described above with respect to FIG. 3A. For this example, it is desirable to use the fourth-order harmonics of the PWM signals I', $\overline{I'}$, Q', and $\overline{Q'}$ to generate the QAM output signal, and therefore all harmonics other than the fourth-order harmonics are to be suppressed from the I and Q signal information. Because the fourth-order harmonics have a frequency that is four times the frequency of $f_{CLK}$, the frequency of the resulting QAM output signal may be four times the frequency of the clock signals CLK(I) and CLK(Q). In other words, by using the fourth-order harmonics of the I and Q PWM signals to generate the QAM output signal, the frequency of the clock signals CLK(I) and CLK(Q) may be only one-fourth of the frequency of the QAM output signal, which in turn may further relax the requirements of the clock generation circuits (e.g., local oscillator circuits) used to generate CLK(I) and CLK(Q). Note that when using the fourth-order harmonics of the I and Q PWM signals to generate the QAM output signal, the phase-difference between the clock signals CLK(I) and CLK(Q) may be 22.5 degrees. In addition, because the switching frequency of the driver circuits 223A1-223A2 and 223B1-223B2 is approximately equal to $f_{CLK}$, driver circuits 223A1-223A2 and 223B1-223B2 may be switched at one-fourth the frequency of the QAM output signal, which in turn may further improve the efficiency of the driver circuits 223A1-223A2 and 223B1-223B2.

More generally, using the $N^{th}$-order harmonics of the I and Q PWM signals to generate the QAM output signal may allow the frequency of clock signals CLK(I) and CLK(Q) to be $1/N^{th}$ the frequency of the QAM output signal, may allow the driver circuits 223A1-223A2 and 223B1-223B2 to be switched at $1/N^{th}$ of the frequency of the QAM output signal, and may result in a phase difference between CLK(I) and CLK(Q) of 1/N times 90 degrees.

Figure 1:
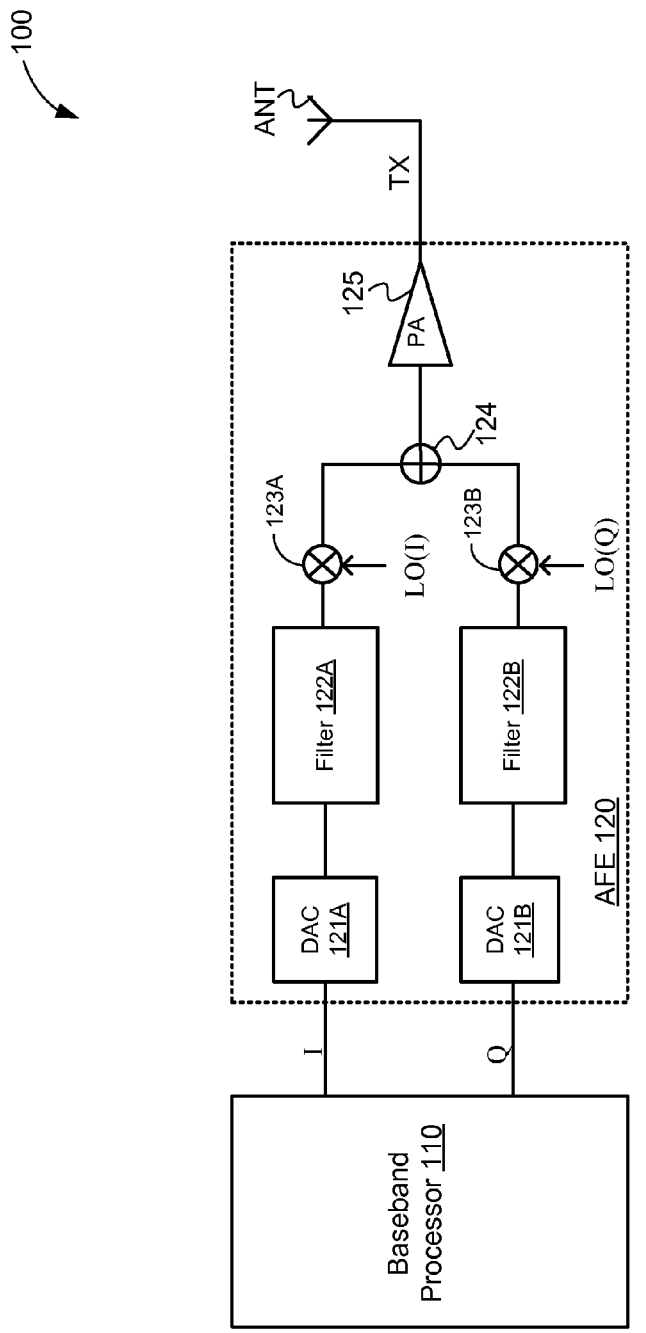
FIG. 1 is a block diagram of a conventional QAM transmitter.

Note that in contrast to the conventional QAM transmitter 100 of FIG. 1 (which sums the I and Q signals prior to amplification by the PA 125), the QAM transmitter 200 of FIGS. 2A-2B may amplify the I and Q signal components (using driver circuits 223A1-223A2 and 223B1-223B2) prior to summing (via the summing node 253).

Figure 4A:
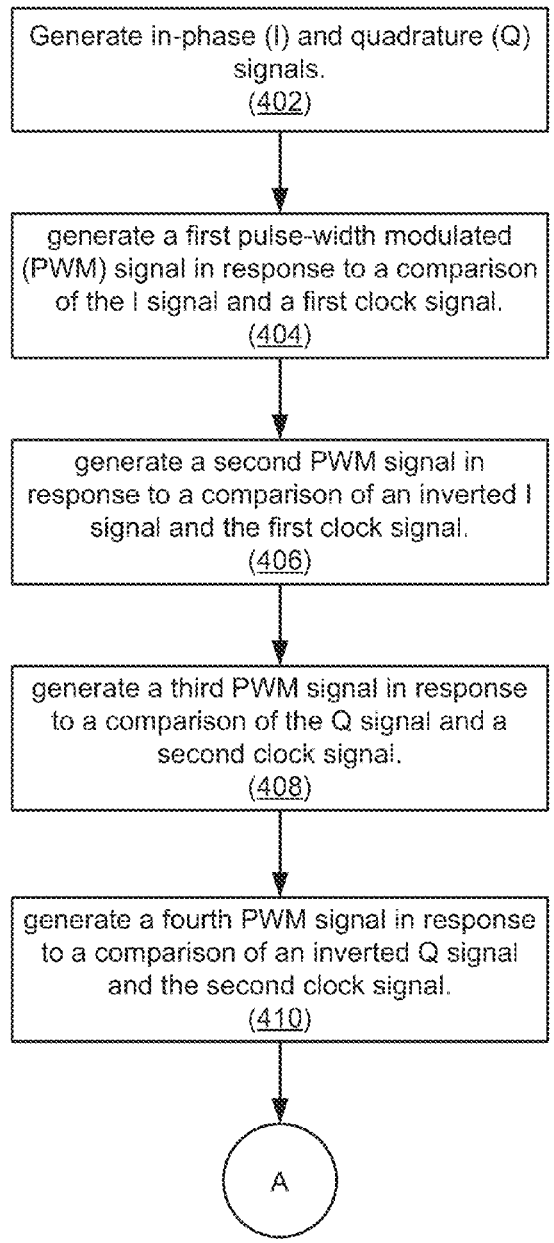
FIGS. 4A-4B depict a flowchart illustrating an exemplary method for generating QAM output signals in accordance with some embodiments.
Figure 4B:
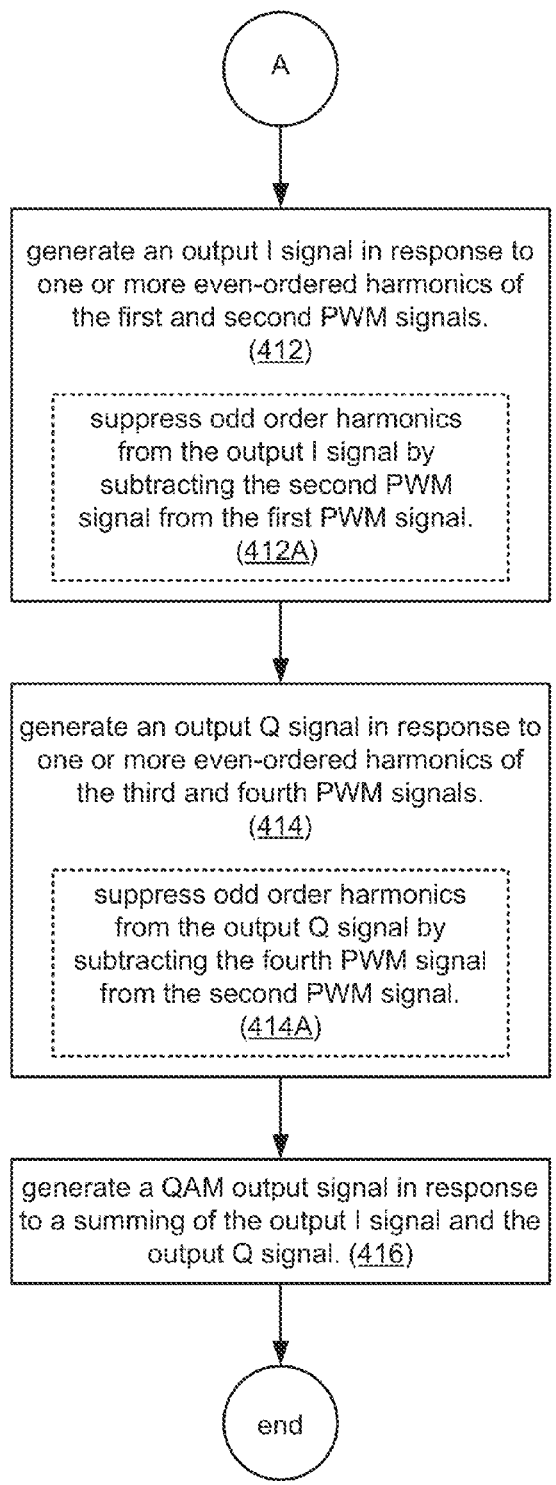

An exemplary operation of transmitter 200 is described below with respect to the illustrative flow chart 400 depicted in FIGS. 4A-4B. Referring also to FIGS. 2A-2B, the baseband processor 210 generates in-phase (I) and quadrature (Q) signals (402). After the I and Q signals are converted from the digital domain to the analog domain (e.g., using the first DAC 221A and the second DAC 221B), the first duty cycle controller 222A1 generates a first PWM signal in response to a comparison of the I signal and the first clock signal CLK(I) (404), the second duty cycle controller 222A2 generates a second PWM signal in response to a comparison of the inverted I signal and the first clock signal CLK(I) (406); the third duty cycle controller 222B1 generates a third PWM signal in response to a comparison of the Q signal and the second clock signal CLK(Q) (408); and the fourth duty cycle controller 222B2 generates a fourth PWM signal in response to a comparison of the inverted Q signal and the second clock signal CLK(Q) (410).

Then, the power combiner 225 generates the output I signal in response to one or more even-ordered harmonics of the first and second PWM signals (412), and generates the output Q signal in response to one or more even-ordered harmonics of the third and fourth PWM signals (414). More specifically, first signal combiner 251A may suppress odd-order harmonics from the output I signal by subtracting the second PWM signal from the first PWM signal (412A), and the second signal combiner 251B may suppress odd-order harmonics from the output Q signal by subtracting the fourth PWM signal from the third PWM signal (414A). Further, the first filter 252A may suppress unwanted even-order harmonics from the output I signal, and the second filter 252B may suppress unwanted even-order harmonics from the output Q signal. Thereafter, the resulting output I and Q signals are summed in summing node 253 to generate the QAM output signal (416).

While the method 400 includes a number of operations that appear to occur in a specific order, it should be apparent that the method 400 can include more or fewer operations. An order of two or more operations may be changed and two or more operations may be combined into a single operation.

Figure 5:
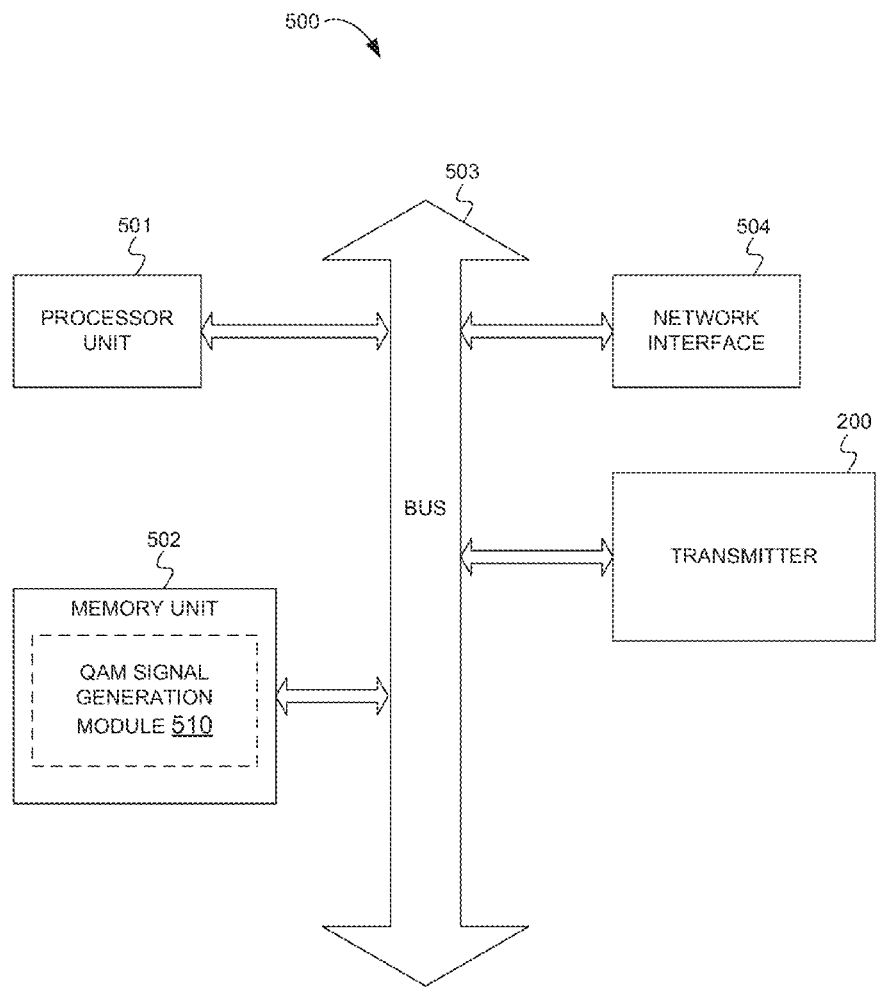
FIG. 5 is a block diagram of a communication device in accordance with some embodiments.

FIG. 5 is an example of a block diagram of a communication device 500 that may include the present embodiments. In some embodiments, the device 500 is a wireless device (e.g., a WLAN device, such as a personal computer, laptop or tablet computer, mobile phone, personal digital assistant, GPS device, wireless access point, or other electronic device). In some embodiments, the device 500 has a wired network connection.

The device 500 includes a processor unit 501, a memory unit 502, a network interface 504, and transmitter 200 (FIG. 2) coupled by a bus 503. The processor unit 501 includes one or more processors and/or processor cores. For some embodiments, the network interface 504 includes at least one wired network interface (e.g., an Ethernet interface, an EPON interface, an EPoC interface, etc.). For other embodiments, the device 500 includes at least one wireless network interface (e.g., a WLAN interface, a Bluetooth® interface, a WiMAX interface, a ZigBee® interface, a Wireless USB interface, etc.).

The memory unit 502 includes a non-transitory computer-readable storage medium (e.g., one or more nonvolatile memory elements, such as EPROM, EEPROM, Flash memory, a hard disk drive, and so on) that stores a QAM signal generation software module 510. In some embodiments, the software module 510 includes one or more programs with instructions that, when executed by processor unit 501 and/or by the baseband processor 210 (FIG. 2A), cause the communication device 500 to perform the method 400 of FIGS. 4A-4B.

Although the present embodiments are described above in the context of a transmitter 200 (FIGS. 2A and 2B), it is to be understood that the present embodiments are equally applicable to a receiver portion of a corresponding transceiver. Further, various aspects and components of the present embodiments may be applicable to any device having I and Q signal paths.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A quadrature amplitude modulation (QAM) transmitter, comprising:
    a baseband circuit to generate an in-phase (I) signal and a quadrature (Q) signal;
    a first circuit, having inputs to receive the I signal and a first clock signal, to generate a first pulse-width modulated (PWM) signal;
    a second circuit, having inputs to receive an inverted I signal and the first clock signal, to generate a second PWM signal;
    a third circuit, having inputs to receive the Q signal and a second clock signal, to generate a third PWM signal;

a fourth circuit, having inputs to receive an inverted Q signal and the second clock signal, to generate a fourth PWM signal;

a first signal combiner, coupled to the first and second circuits, to generate an output I signal in response to one or more even-ordered harmonics of the first and second PWM signals, wherein the first signal combiner is to suppress odd order harmonics from the output I signal by subtracting the second PWM signal from the first PWM signal;

a second signal combiner, coupled to the third and fourth circuits, to generate an output Q signal in response to one or more even-ordered harmonics of the third and fourth PWM signals, wherein the second signal combiner is to suppress odd order harmonics from the output Q signal by subtracting the fourth PWM signal from the third PWM signal; and a summing node to generate a QAM output signal in response to a summing of the output I signal and the output Q signal, wherein a frequency of the QAM output signal approximately equals a number N times a frequency of the first clock signal, wherein N is an even integer greater than 2.

2. The QAM transmitter of claim 1, wherein:
the first signal combiner is to suppress fundamental frequency components of the first and second PWM signals prior to generating the output I signal; and
the second signal combiner is to suppress fundamental frequency components of the third and fourth PWM signals prior to generating the output Q signal.

3. The QAM transmitter of claim 1, wherein the output I signal is an eighth order harmonic of the first PWM signal, the output Q signal is an eighth order harmonic of the third PWM signal, and a frequency of the QAM output signal is equal to approximately eight times a frequency of the first and second clock signals.

4. The QAM transmitter of claim 1, wherein the output I signal is a fourth order harmonic of the first PWM signal, the output Q signal is a fourth order harmonic of the third PWM signal, and a frequency of the QAM output signal is equal to approximately four times a frequency of the first and second clock signals.

5. The QAM transmitter of claim 1, wherein the first, second, third, and fourth circuits each comprises a duty cycle controller.

6. The QAM transmitter of claim 1, wherein the first signal combiner, the second signal combiner, and the summing node together comprise a power combiner.

7. The QAM transmitter of claim 1, further comprising:
a first CMOS driver circuit, coupled between the first circuit and the first signal combiner, to amplify the first PWM signal; and
a second CMOS driver circuit, coupled between the second circuit and the first signal combiner, to amplify the second PWM signal, wherein the first and second CMOS driver circuits are to operate as switched-mode amplifiers.

8. The QAM transmitter of claim 7, wherein a frequency of the QAM output signal is an even integer multiple of a switching frequency of the first and second CMOS driver circuits.

9. A communication device, comprising:
a baseband circuit to generate an in-phase (I) signal and a quadrature (Q) signal;
one or more processors; and
a memory storing instructions that, when executed by the one or more processors, cause the communication device to:

generate a first pulse-width modulated (PWM) signal in response to a comparison of the I signal and a first clock signal;
generate a second PWM signal in response to a comparison of an inverted I signal and the first clock signal;
generate a third PWM signal in response to a comparison of the Q signal and a second clock signal;
generate a fourth PWM signal in response to a comparison of an inverted Q signal and the second clock signal;
generate an output I signal in response to one or more even-ordered harmonics of the first and second PWM signals;
suppress odd order harmonics from the output I signal by subtracting the second PWM signal from the first PWM signal;
generate an output Q signal in response to one or more even-ordered harmonics of the third and fourth PWM signals;
suppress odd order harmonics from the output Q signal by subtracting the fourth PWM signal from the third PWM signal; and
generate a QAM output signal in response to a summing of the output I signal and the output Q signal, wherein a frequency of the QAM output signal approximately equals a number N times a frequency of the first clock signal, wherein N is an even integer greater than 2.

10. The communication device of claim 9, wherein:
execution of the instructions to generate the output I signal causes the communication device to suppress fundamental frequency components of the first and second PWM signals prior to generating the output I signal; and
execution of the instructions to generate the output Q signal causes the communication device to suppress fundamental frequency components of the third and fourth PWM signals prior to generating the output Q signal.

11. The communication device of claim 9, wherein the output I signal is an eighth order harmonic of the first PWM signal, the output Q signal is an eighth order harmonic of the third PWM signal, and a frequency of the QAM output signal is equal to approximately eight times a frequency of the first and second clock signals.

12. The communication device of claim 9, wherein the output I signal is a fourth order harmonic of the first PWM signal, the output Q signal is a fourth order harmonic of the third PWM signal, and a frequency of the QAM output signal is equal to approximately four times a frequency of the first and second clock signals.

13. A method for generating a quadrature amplitude modulation (QAM) output signal in response to an in-phase (I) signal and a quadrature (Q) signal, the method comprising:
generating a first pulse-width modulated (PWM) signal in response to a comparison of the I signal and a first clock signal;
generating a second PWM signal in response to a comparison of an inverted I signal and the first clock signal;
generating a third PWM signal in response to a comparison of the Q signal and a second clock signal;
generating a fourth PWM signal in response to a comparison of an inverted Q signal and the second clock signal;
generating an output I signal in response to one or more even-ordered harmonics of the first and second PWM signals;
suppressing odd order harmonics from the output I signal by subtracting the second PWM signal from the first PWM signal;

generating an output Q signal in response to one or more even-ordered harmonics of the third and fourth PWM signals;
suppressing odd order harmonics from the output Q signal by subtracting the fourth PWM signal from the third PWM signal; and
generating a QAM output signal in response to a summing of the output I signal and the output Q signal, wherein a frequency of the QAM output signal approximately equals a number N times a frequency of the first clock signal, wherein N is an even integer greater than 2.

14. The method of claim 13, further comprising:
suppressing fundamental frequency components of the first and second PWM signals prior to generating the output I signal; and
suppressing fundamental frequency components of the third and fourth PWM signals prior to generating the output Q signal.

15. The method of claim 13, wherein the output I signal is an eighth order harmonic of the first PWM signal, the output Q signal is an eighth order harmonic of the third PWM signal, and a frequency of the QAM output signal is equal to approximately eight times a frequency of the first and second clock signals.

16. The method of claim 13, wherein the output I signal is a fourth order harmonic of the first PWM signal, the output Q signal is a fourth order harmonic of the third PWM signal, and a frequency of the QAM output signal is equal to approximately four times a frequency of the first and second clock signals.

17. A quadrature amplitude modulation (QAM) transmitter, comprising:
means for generating a first pulse-width modulated (PWM) signal in response to a comparison of an in-phase (I) signal and a first clock signal;
means for generating a second PWM signal in response to a comparison of an inverted I signal and the first clock signal;
means for generating a third PWM signal in response to a comparison of a quadrature (Q) signal and a second clock signal;
means for generating a fourth PWM signal in response to a comparison of an inverted Q signal and the second clock signal;
means for generating an output I signal in response to one or more even-ordered harmonics of the first and second PWM signals;
means for suppressing odd order harmonics from the output I signal by subtracting the second PWM signal from the first PWM signal;
means for generating an output Q signal in response to one or more even-ordered harmonics of the third and fourth PWM signals;
means for suppressing odd order harmonics from the output Q signal by subtracting the fourth PWM signal from the third PWM signal; and
means for generating a QAM output signal in response to a summing of the output I signal and the output Q signal, wherein a frequency of the QAM output signal approximately equals a number N times a frequency of the first clock signal, wherein N is an even integer greater than 2.

18. The transmitter of claim 17, further comprising:
means for suppressing fundamental frequency components of the first and second PWM signals prior to generating the output I signal; and
means for suppressing fundamental frequency components of the third and fourth PWM signals prior to generating the output Q signal.

19. The transmitter of claim 17, wherein the output I signal is an eighth order harmonic of the first PWM signal, the output Q signal is an eighth order harmonic of the third PWM signal, and a frequency of the QAM output signal is equal to approximately eight times a frequency of the first and second clock signals.

20. The transmitter of claim 17, wherein the output I signal is a fourth order harmonic of the first PWM signal, the output Q signal is a fourth order harmonic of the third PWM signal, and a frequency of the QAM output signal is equal to approximately four times a frequency of the first and second clock signals.

* * * * *